United States Patent [19]
Lemor

[11] 3,902,377
[45] Sept. 2, 1975

[54] BALL SCREW AND NUT MECHANISM

[75] Inventor: Pierre Lemor, Drumettaz-Clarafond, France

[73] Assignee: La Technique Integrale, Chambery, France

[22] Filed: Oct. 23, 1973

[21] Appl. No.: 408,883

[52] U.S. Cl. .............................. 74/459; 74/424.8 R
[51] Int. Cl. ............................................ F16h 55/04
[58] Field of Search ............ 74/459, 89.15, 424.8 R

[56] References Cited
UNITED STATES PATENTS
3,053,105  9/1962  Cole .................................... 74/459
3,242,817  3/1966  Stoeckicht ........................... 74/459

FOREIGN PATENTS OR APPLICATIONS
1,178,125  12/1958  France ................................. 74/459

Primary Examiner—Samuel Scott
Assistant Examiner—Wesley S. Ratliff, Jr.
Attorney, Agent, or Firm—Daniel M. Rosen

[57] ABSTRACT

This screw and nut mechanism with ball circulation means comprises between the turns of the nut threads and those of the screw threads one or more helical grooves of same pitch as said threads, to constitute a helical channel for the free re-circulation of the balls; the ends of the re-circulation channel are connected to the ends of the screw and nut threads via passage sections machined in the tapped surface of the nut; this mechanism is suitable for converting a movement of translation into a movement of rotation, and vice versa.

7 Claims, 3 Drawing Figures

BALL SCREW AND NUT MECHANISM

BACKGROUND OF THE INVENTION

This invention relates in general to ball-circulation screw and nut mechanisms for converting a movement of rotation into a movement of translation, or vice versa.

Mechanisms of this character are already known wherein the nut comprises at least one ball re-circulation channel for returning the balls emerging from the nut threads near one of the ends faces of this nut to the thread inlets, near its opposite end face. This re-circulation channel may consist essentially of a hole drilled in the nut wall, parallel to the nut axis. This known arrangement is objectionable on the one hand in that the nut must have a radial thickness sufficient to permit the drilling of said hole, and on the other in that it imparts an imbalance to the nut which may prove detrimental in case of rapid rotational movements.

SUMMARY OF THE INVENTION

The mechanism according to the present invention is of the above-defined type but free of the inconveniences disclosed hereinabove. It is characterized in that its screw and nut have formed between the adjacent turns of their threads, respectively, helical grooves of same pitch as said threads and so disposed that they constitute between them at least one helical channel for re-circulating the balls. The cross-sectional dimension of this helical channel is such that the balls can circulate freely therein, and that means are provided at either ends of said nut for permitting the passage of balls from the ends of the nut thread or threads to the relevant ends of the helical re-circulation channel or channels.

The re-circulation channel (or channels) formed in the mechanism of this invention has the same helical symmetry as its nut. These channels do not create any imbalance in the nut; also the provision of at least one such helical re-circulation channel does not set (for the radial width of the nut) a minimum limit as high as in the case of a conventional re-circulation channel of known type, which as explained hereinabove consists mainly of an axial hole drilled along the nut wall and parallel to the nut axis.

Moreover, the mechanism according to this invention is advantageous in that it comprises a nut threaded internally on nearly the entire nut length. This feature, with a given ball diameter provides an improved stress transmission capacity between the screw and nut; and consequently a mechanism according to this invention can be made with a screw and nut assembly having a relatively large pitch without unduly increasing the axial length of the nut.

According to a preferred embodiment of the invention, each end of each nut thread is connected to the corresponding end of the helical re-circulation channel through a passage formed in the nut, and means are provided on said nut for guiding the transfer of balls from each passage end to the corresponding end of the nut thread or re-circulation channel. Preferably, the passage comprises a transfer section coaxial to the nut forming a race leading away from the axis of the nut, and formed in a plane parallel and adjacent to one of the end faces of this nut, said transfer section opening into the corresponding end of the nut thread, in a plane tangent to said thread, and being followed by a section substantially parallel to the nut axis, which opens into the corresponding end of the re-circulation channel. With this last-described arrangement the balls which, due to the relative helical movement of the screw and nut, enter one end of a nut thread, penetrate into said transfer section of the corresponding passage, and are gradually removed from the screw thread along this section; thus, when the balls have been removed completely from the screw thread, they move from the transfer section of the passage to the passage section parallel to the nut axis, so as to be brought to the corresponding end of the helical re-circulation channel. With this specific embodiment, the radial width of the nut may exceed the ball diameter only by the moderate material thickness necessary for closing externally the passage section substantially parallel to the nut axis.

BRIEF DESCRIPTION OF THE DRAWINGS

A preferred embodiment of the mechanism of this invention will now be described by way of example with reference to the attached drawings, in which.

DESCRIPTION OF THE PREFERRED EMBODIMENT

Figure 1:
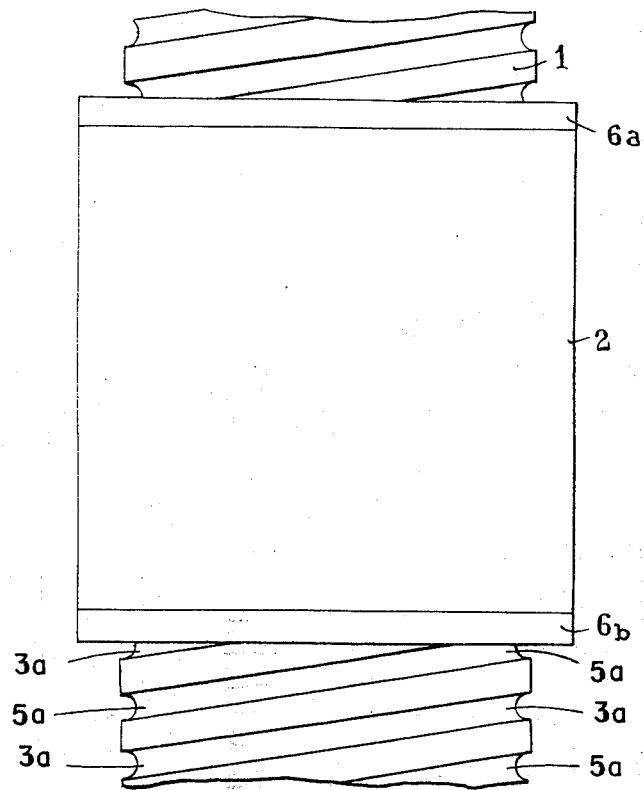
FIG. 1 is an elevation view of a screw section engaged by the ball-circulation nut.
Figure 2:
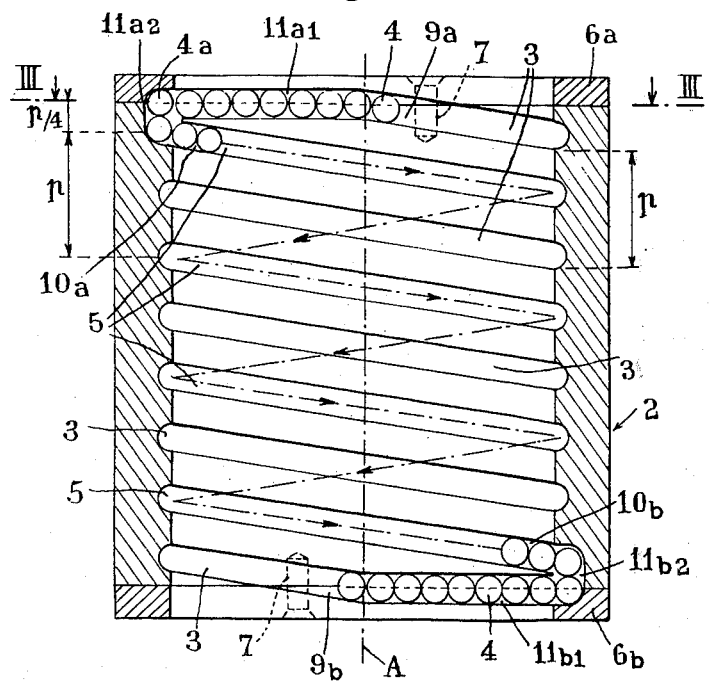
FIG. 2 is a sectional view showing the nut separately, the section being taken along its axial plane.

In FIG. 1, the ball circulation mechanism of this invention is comprised of a screw 1 and a nut 2, and in the form of embodiment illustrated these screw and nut comprise each a single thread having a pitch $p$ (FIG. 2, in which the single thread of the nut is designated by the reference numeral 3). A plurality of balls 4 are introduced in a manner known per se into the thread 3 of nut 2 and, of course, into the corresponding portions of the screw thread; the radii of the nut thread sections and of the corresponding screw thread sections are consistent with the diameter of said balls 4 so that these balls be properly guided in drive channels, in a substantially non-play manner, for transmitting efforts between the screw 1 and nut 2, also with no play, or at least with minimum of play between said parts.

According to this invention, a second helical groove 5 (of which only one is provided in the embodiment contemplated) is formed between the adjacent turns of the nut thread 3 (first helical groove), and an identical (and also single in this embodiment) second helical groove 5a is also formed between the adjacent turns of the single thread 3a of screw 1; the first and second helical grooves 5 of nut 2 and 5a of the screw 1 have the same pitch $p$ as the threads 3 of nut 2 and 3a of the screw 1, but the former are furthermore so disposed that, when the nut 2 is engaged on screw 1, they provide a so-called ball re-circulation helical channel (to be designated by the reference numeral 5 in the following disclosure); as clearly shown in FIG. 2, the helical groove 5 of nut 2 (like the corresponding helical groove of screw 1) is substantially equally spaced from the adjacent turns of the nut thread 3 (or of the corresponding screw thread); in other words, said helical groove is shifted axially by a distance $p/2$ with respect to the thread 3; this arrangement is quite advantageous; however, it will be readily understood that the position of each helical groove such as 5 in relation to the adjacent turns of the thread such as 3 is immaterial, provided that this choice does not interfere with machining possibilities. The depth and/or width of the cross-section of the helical groove 5 of nut 2, (and possibly also those of the corresponding helical groove of screw 1,) are selected to be slightly greater than those of the threads of said nut and screw, so that the balls 4 can circulate freely, i.e., with a certain play, in the re-circulation channel corresponding to said groove 5.

Figure 3:
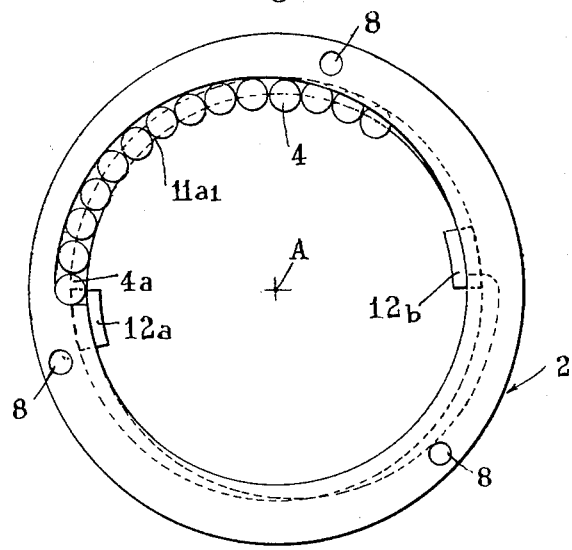
FIG. 3 is an end view of the nut as seen in the direction of the arrows III—III of FIG. 2.

In the form of embodiment illustrated in FIG. 2 and 3, annular flanges 6a and 6b are secured by means of screws 7 engaging tapped holes 8 of nut 2 to the upper and lower end faces of said nut 2, respectively; the reference symbols 9a and 9b designate the ends of the nut thread or drive channel 3 which open into said end faces, i.e., the upper and lower faces, respectively, of the nut, under the inner edges of said annular flanges 6a and 6b. In the embodiment illustrated each end portion such as 9a of the nut thread 3 is connected to the corresponding end 10a of the helical re-circulation channel 5 through a passage formed partly in the nut 2, near its inner tapped surface, and partly in the inner edge of the relevant annular flange 6a secured to the adjacent end face of nut 2. In the embodiment contemplated herein this passage comprises two sections, that is, a first transfer section $11_{a1}$ forming a race leading away from the axis of the nut member, of which the curved axis (shown in dash lines in FIG. 3) corresponds to the intersection curve of the helical torus bounded by the screw and nut threads with a plane perpendicular to the nut axis A, i.e., a plane parallel and adjacent to the upper end face (FIG. 2) of nut 2; the axis of said section $11_{a1}$ may also correspond to a curve tangent to said intersection curve (a circle, a parabola, etc.). As clearly shown in FIGS. 2 and 3, this passage section $11_{a1}$ opens into the corresponding end 9a of thread 3 of nut 2, in a plane tangent to said thread, and is followed by a passage section $11_{a2}$ parallel to the nut axis A and opening into the corresponding end 10a of re-circulation channel 5. In the embodiment illustrated in FIG. 2, the axial length of this passage section $11_{a2}$ corresponds substantially to $p/4$. Whereas this passage section $11_{a2}$ is machined completely in the thickness of nut 2, the passage section $11_{a1}$ is machined only partially in the upper face of nut 2, the remaining fraction of the section being machined in the lower face of the lower edge of annular flange 6a.

Similarly, the lower end 9b of thread 3 of nut 2 is connected to the corresponding end 10b of the re-circulation channel 5 via a passage comprising like the preceding one an transfer section $11_{b1}$ and another section $11_{b2}$ parallel to the nut axis A.

When a relative helical movement is produced between the screw 1 and nut 2, the balls 4 circulate as follows in the nut 2: if the direction of this relative movement is such that they run along the nut thread 3, and also along the corresponding or registering portion of the screw thread, upwards (as seen in FIG. 2), the balls 4 attaining the upper end 9a of said thread 3 will engage the section $11_{a1}$ of the passage formed in said nut; this transfer is facilitated by the fact that the screw thread causes the ball arriving at 9a to be removed from the thread 3 of nut 2.

In the embodiment contemplated herein the contour of the transfer passage $11_{a1}$ is such that the ball 4a arrives at the end of the passage after having revolved through an angle of about 90° about the nut axis A, is disengaged completely from the corresponding thread of screw 1; now since at the same time this ball 4a is plumb or aligned to the passage section $11_{a2}$ parallel to the nut axis A, it will pass through this section $11_{a2}$ and eventually reach the inlet 10a of the helical re-circulation channel 5; at this point, a projecting member 12a is secured to the nut through any suitable means for facilitating the transfer of balls from the end of said passage to the corresponding end of the re-circulation channel 5. Then the balls 4 travel along said re-circulation channel 5 by following the path shown in chain-dotted lines in FIG. 2, in the direction of the arrows, i.e., downwards as seen in the Figure; during this re-circulation phase, the balls 4 do not assist in transmitting stress between the screw and nut, due to their clearance in the re-circulation channel 5. When the balls 4 reach the lower end 10b of this channel 5 they are returned to the lower end 9b of the nut thread 2 and the corresponding portion of the screw thread by means of the two transfer sections $11_{b2}$ and $11_{b1}$, so that these balls will have travelled along a closed circuit.

The above-described embodiment of the mechanism according to this invention may lend itself to many modifications all within the scope of the invention; a few of such modification will be mentioned by way of example, not of limitation: instead of being completed by annular flanges 6a and 6b secured to its end faces, the nut 2 may constitute a single unit, provided that the necessary machining operations can be performed. Instead of comprising a single thread such as 3, the nut 2 and screw 1 may each comprise a whole number $n$ of such threads; in this case, the nut 2 and screw 1 must comprise the same number $n$ of helical grooves so disposed as to form therebetween $n$ helical recirculation channels each associated with $n$ threads of the nut and screw; in this case, the nut comprises $n$ independent closed circuits for the ball re-circulation.

Each passage connecting one end of a nut thread to the corresponding end of the re-circulation channel may have a shape other than that illustrated in FIGS. 2 and 3, but suitable for extracting the balls from the screw thread or threads, at the level of each end of each nut thread, and for re-introducing said balls into the relevant end of the helical re-circulation channel.

The embodiment illustrated in the attached drawings and described hereinabove has been manufactured and tested satisfactorily by using the following dimensions:

| | |
|---|---|
| Rated diameter of screw 1 | 50 mm |
| Pitch $p$ | 10 mm |
| Rated diameter of nut 2 | 60 mm |
| Axial length of nut | 55 mm |
| Number of turns of nut thread 3 | 4½ |
| Ball diameter $d$ | 3.175 mm (⅛") |

The mechanism according to this invention may be constructed with a relatively high pitch to screw diameter ratio, thus permitting of transforming a relatively slow rotational movement into a relatively rapid movement of translation, or vice versa.

What is claimed as new is:

1. A ball screw and nut mechanism for converting a movement of rotation into a movement of translation or vice versa, comprising a screw member and a nut member each having at least one first and one second helical groove of same pitch, one of said grooves axially shifted relative to the other, the first grooves of said members defining a first helical channel having a predetermined cross-section, and the second grooves forming a helical re-circulation channel having substantially larger predetermined cross-section, a train of balls for movement in said first channel, said balls having size congruent to the cross-section of said first channel to permit transmission of force between the members, and means for transferring said balls from each end of said first helical channel into the corresponding end of the helical re-circulation channel and vice versa, whereby the balls arriving at one end of said first channel are permitted to freely circulate through said helical re-circulation channel, then are transferred to the other end of said first channel.

2. Mechanism as set forth in claim 1, wherein each end of the first helical groove of said nut member is connected to the corresponding end of the second helical groove of said nut member through a passage formed in said nut member.

3. A re-circulating ball, screw and nut apparatus operable with a plurality of balls having first diameter, comprising cooperating screw and nut members having adjacent mating surfaces, wherein rotary motion of one of said members relative to the other causes axial motion of the other member, each of said members having defined in its mating surface a first helical groove having a predetermined pitch and having top and bottom ends and a second similar helical groove of the same pitch and shifted axially relative to the first groove by a fraction of said pitch, said first groove of the nut being adjacent a portion of the first groove of the screw member and forming between them a drive channel of diameter congruent with said first diameter for transmission of force between said members when balls are in said drive channel, and said second groove of the nut being adjacent a portion of the second groove of the screw and forming between them a re-circulation channel having second diameter greater than said first diameter, said nut member further comprising a top transfer channel having diameter at least equal to said first diameter and extending only in said nut's mating surface and between and connecting the top ends of the first and second grooves in said nut, and a bottom transfer channel having diameter at least equal to said first diameter and extending only in said nut's mating surface and between and connecting the bottom ends of said first and second grooves in the nut, said drive, re-circulation top, and bottom channels forming a continuous passage, whereby during rotation of one of said members relative to the other, said balls are movable in the drive channel, to and through one transfer channel to said re-circulation channel, and thence to and through the other transfer channel.

4. Apparatus according to claim 3 wherein said top transfer channel comprises first and second sections, the first section having a first end opening into the top end of said first groove, and a second end, the second section extending generally parallel with said nut axis, and interconnecting said second end of the first section and the top end of said second groove, and said bottom transfer channel being similar to the top transfer channel connecting said bottom ends of said first and second grooves.

5. Apparatus according to claim 4 wherein said first section is a race generally tangent to said first groove and extending radially outward therefrom relative to said nut axis, in a plane transverse to said nut axis.

6. Apparatus according to claim 4 wherein said nut comprises top and bottom ends, the apparatus further comprising an annular plate securable to each of said ends, and said transfer channels each comprise two adjacent grooves, one of which is in one end plate and the other of which is in one end of said nut.

7. A re-circulating ball, screw and nut apparatus comprising cooperating screw and nut members having adjacent mating surfaces, wherein rotary motion of one of said members relative to the other causes axial motion of the other member, each of said members having defined in its mating surface axially spaced-apart first and second helical grooves of the same pitch, one of said grooves axially shifted relative to the other, and each groove has top and bottom ends, said first groove of the nut being adjacent the first groove of the screw member and forming a drive channel of first diameter, and said second groove of the nut being adjacent the second groove of the screw and forming a recirculation channel having second diameter at least equal to said first diameter, said nut member further comprising first means providing a channel having diameter at least equal to said first diameter between and connecting the top ends of the first and second grooves in said nut, and a second means providing a transfer channel having diameter at least equal to said first diameter between and connecting the bottom ends of said first and second grooves in the nut, said drive, re-circulation, and transfer channels forming a continuous passage, the apparatus further comprising a plurality of balls of diameter slightly smaller than said first diameter and situated in said passage, whereby during rotation of one of said members relative to the other there is transmission of force between said members and said balls are movable in the drive channel to and through one transfer channel to said re-circulation channel, and to the other transfer channel.

* * * * *